United States Patent [19] [11] 3,904,838
Stewart [45] Sept. 9, 1975

[54] TWO-WIRE, BI-DIRECTIONAL VOICE FREQUENCY REPEATER

[75] Inventor: Alan Stewart, Guelph, Canada

[73] Assignee: International Standard Electric Corporation, New York, N.Y.

[22] Filed: July 30, 1973

[21] Appl. No.: 384,107

Related U.S. Application Data

[63] Continuation of Ser. No. 149,934, June 4, 1971, abandoned.

[52] U.S. Cl. .............................................. 179/170 R
[51] Int. Cl.$^2$ .............................................. H04B 3/36
[58] Field of Search ...... 179/170 R, 170 T, 170 NC, 179/170.2, 16 F

[56] References Cited

UNITED STATES PATENTS

| | | | |
|---|---|---|---|
| 2,615,997 | 10/1952 | Brodie | 179/170 NC |
| 2,733,303 | 1/1956 | Koenig | 179/170 T |
| 2,788,396 | 4/1957 | Abraham | 179/170 R |
| 2,885,492 | 5/1959 | D'Heedene | 179/170 R |
| 3,180,947 | 4/1965 | Haselton, Jr. et al. | 179/170 NC |
| 3,480,742 | 11/1969 | Gaunt, Jr. | 179/170 NC |
| 3,586,793 | 6/1971 | Neal | 179/170.2 |
| 3,588,352 | 6/1971 | Yamawaki | 179/170.2 |
| 3,778,563 | 12/1973 | Bise et al. | 179/170 R |

*Primary Examiner*—Kathleen H. Claffy
*Assistant Examiner*—Randall P. Myers
*Attorney, Agent, or Firm*—James B. Raden, Marvin M. Chaban

[57] ABSTRACT

A two-wire, bi-directional voice repeater utilizes identical unidirectional amplifiers, one for each direction of transmission. Signals for one direction of transmission are inverted across the transformer output wires by transformer action. A further inversion in one wire serving as the input to an amplifier restores signals for that direction of transmission to an in-phase condition. The signals are fed additively to the amplifier for amplification of signals for that direction. Signals which have not been inverted prior to the further inversion are inverted and will be cancelled in the amplifier input circuit. The signals cancelled may be echoes, positive feedback "singing" signals or reflected signals fed back from the path for the other direction of transmission.

5 Claims, 9 Drawing Figures

$v_{A1} > v_{B1}$ OR $v_{C1}$
$\therefore\ v_{A1} = v_{B1} + v_{C1}$ $v_{C2} > v_{A2}$ OR $v_{B2}$
$\therefore\ v_{C2} = v_{A2} + v_{B2}$
$\therefore\ v_{A2} = v_{C2} - v_{B2}$ $\frac{R_B}{R_C} = \frac{1}{\alpha}$, $\alpha >> 1$ $\frac{R_B}{R_C} = \frac{1}{\alpha}$, $\alpha >> 1$

TWO-WIRE, BI-DIRECTIONAL VOICE FREQUENCY REPEATER

This is a continuation, of application Ser. No. 149,934, filed June 4, 1971, now abandoned.

DESCRIPTION OF THE PRIOR ART

Amplification of voice frequencies in two wire telephone systems has been achieved using the principle of the hybrid transformer repeater or by negative impedance techniques. To achieve the high degree of line impedance matching necessary for stable operation both types generally require a multitude of precision balance networks and line build-out sections. The cost and complexity of these systems in addition to the inventory problems associated with these components clearly show that such solutions are clearly not the ultimate solution to the two wire gain problem.

FIELD OF THE INVENTION

The invention relates to voice frequency repeaters usable primarily in telephone systems. Naturally, it is preferable to provide a system which uses two wires to produce bi-directional transmission. In such systems, one requirement is that the gain amplifier should present an impedance as close to the line characteristic as possible. This impedance must be maintained over a range of frequencies even though the line characteristic is not constant. In addition, there are of course a great variety of responses and conditions which must be overcome for the repeater to be capable of general application.

In a bi-directional repeater, signals for each direction must be separated. Thus for the east to west (E-W) transmission path, any west to east (W-E) signals must be separated, cancelled or otherwise prevented from interfering with the E-W signals. For the transmission in the E-W direction, input signals from the east end are the desired signals and signals received from the west end are the unwanted signals which must be controlled and prevented from interfering with the E-W signals. For W-E transmission, of course, the converse is true.

To overcome these problems, I provide a system in which unwanted signals in a transmission path are cancelled by adding signals 180° out of phase with the unwanted signal to be cancelled. The preferred method of achieving this end is to provide a pair of matched amplifiers, one in each transmission path, and ensure that the signals entering and leaving the amplifiers are acted upon by effect of the line transformer and such other circuit components as may be necessary to produce phase shift leading to the described bi-directional discrimination.

SUMMARY OF THE INVENTION

The present invention comprises a bi-directional repeater for use in the voice frequency range. The repeater has one wire for each direction of transmission, the two wires terminating across the secondary of a line transformer. Input signals received by the transformer are inverted relative to one another in the two repeater wires due to the inductive transformer action. In one wire, the signals are inverted a second time, such that input signals in the two wires are now in phase with one another. The signals are combined and forwarded to an amplifier which passes signals which are in-phase. Echoes and signals received from the opposite direction of transmission will not have had the transformer inversion and will be inverted in the one wire. Since these signals will have been inverted only once, they will be out of phase and may be cancelled by being combined additively.

By providing a like network of amplifiers and inverters for each direction of transmission, bi-directional transmission using two wires may be produced.

It is therefore an object of the invention to provide a new and improved two-wire, bi-directional voice frequency repeater for use on subscriber loops.

It is a further object of the invention to provide a voice frequency repeater using the principle of cancellation of unwanted signals by the inversion of the unwanted signal and application of the inverted signal to the unwanted signal.

It is a further object of the invention to produce an improved voice frequency repeater capable of printed circuit card construction.

It is a still further object of the invention to provide a two-wire voice frequency repeater using matched amplifiers for each direction of transmission and by using the line transformer at each transmission end as a major element of the phase inversion of signals for cancellation thereof.

Other objects, features, and advantages of the invention will become apparent by reference to the accompanying description when taken in conjunction with the drawings.

DESCRIPTION OF THE PREFERRED EMBODIMENT

Figure 1:
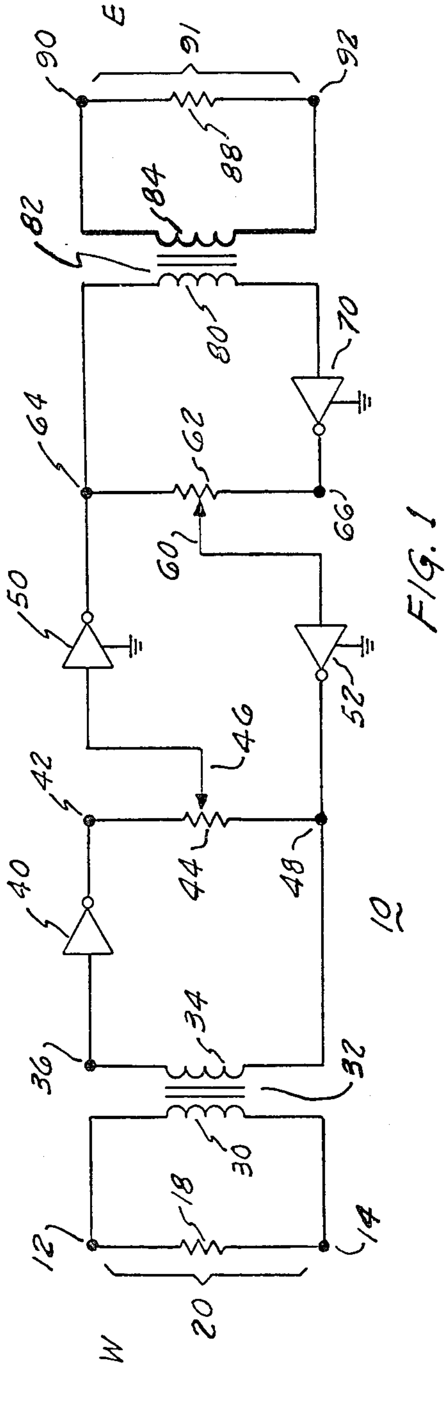
FIG. 1 is a simplified schematic drawing of a two-wire, bi-directional voice frequency repeater using the present invention.

Turning to the drawings in FIG. 1, I show in block diagram form a two-wire bi-directional voice repeater 10 with line terminals 12 and 14 at one end which we will call the west end. A resistance 18 is shown connected across the line terminals 12 and 14 to represent the impedance of a load 20 representing a subscriber station unit connected across the line. Bridged across terminals 12 and 14 is the primary winding 30 of a line transformer 32. The secondary winding 34 of the line transformer has a one to one turns ratio to the primary winding 30 as is well-known in the telephone art.

Connected to a terminal 36 of the transformer secondary is the input of an amplifier 40. This amplifier which will be discussed in greater detail serves as an impedance changer and inverter with a low input resistance and an output resistance, approximately equal to resistance 18. The output terminal 42 of the amplifier 40 is connected to one end of a resistance 44, the amplifier 40 and the resistance 44 comprising a series circuit bridging the secondary winding 34 of the transformer 32. Resistor 44 must be considerably greater than the load resistance 18.

Slider 46 is connected to the input of a main amplifier 50 while terminal 48 is connected to the output of an amplifier 52 matched to amplifier 50 but reversed in direction. Amplifier 50 serves to amplify the west to east signals while amplifier 52 amplifies the east to west signals.

The input terminal of main amplifier 52 is connected to a slider or variable contact 60 of resistor 62, resistor 62 being connected across the two-wire path as indicated by terminals 64 and 66. Terminal 66 is connected to the output of an amplifier 70 in the main east to west path, which is used for impedance change and signal inversion. This amplifier is similar in characteristics and function to amplifier 40 in the west to east path. The secondary 80 of a line transformer 82 has one terminal connected to the input of amplifier 70 and its other terminal connected to terminal 64. The primary 84 of transformer 82 is connected to the resistor 88 representing the impedance of a load 91 at the east end of the system across terminals 90 and 92, these terminals being connected across the primary 84 of transformer 82.

Figure 4A:
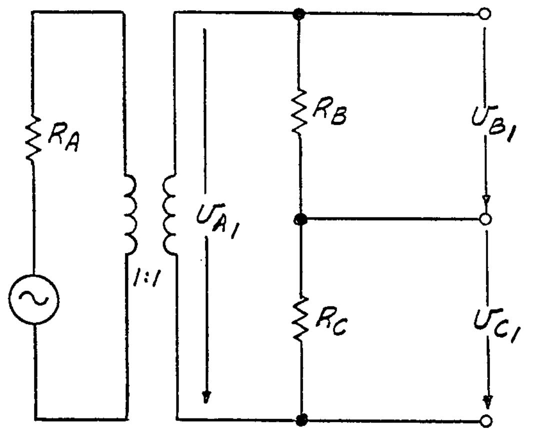
FIGS. 4*a–d* are simplified drawings of a transformer connection outlining the basic principle used herein, with formulae concerning the relationship of the voltages shown.

The principle of operation of the invention depends on some simple relationships which are evident from an inspection of FIGS. 4*a*, *b*, *c*, and *d*.

Figure 4B:
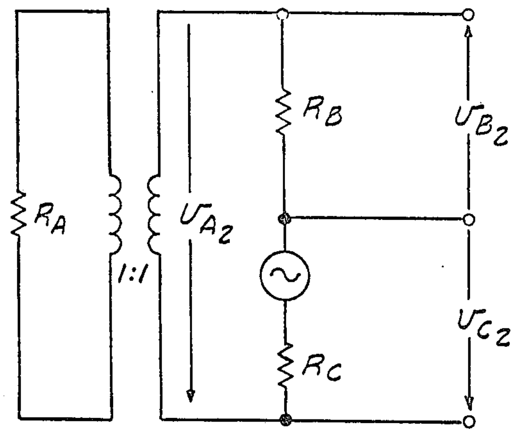

In these figures a load $R_A$ is matched to a pair of resistors $R_B$ and $R_C$ by means of an ideal 1:1 transformer. FIGS. 4*a* and 4*b* indicate that if the source voltage is applied at the in locations shown, there is a polarity change between the voltages across $R_B$ and $R_C$.

Figure 4C:
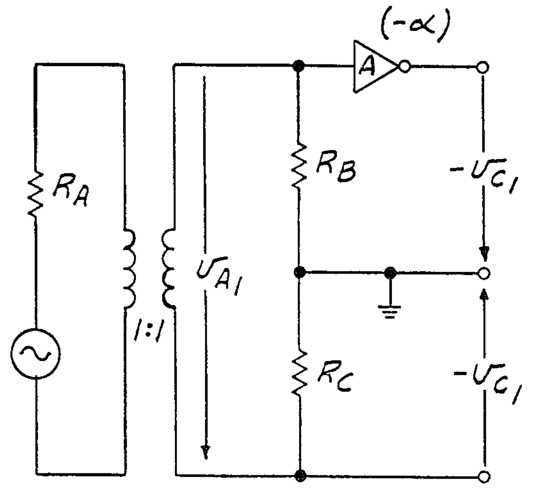
Figure 4D:
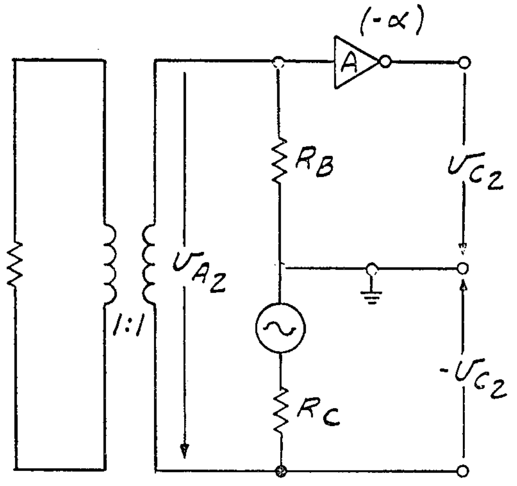

FIGS. 4*c* and 4*d* show the situation when an inverting amplifier A is included and the circuit conditions are referenced to a common ground potential at the junction of $R_B$ and $R_C$. With the amplification factor related to the resistor ratios is the manner shown it can be seen that the voltage existing across $R_B$ can be made equal in magnitude to that across $R_C$. Then in case shown in FIG. 4*c* the voltages are identical in sign while in the case of FIG. 4*d* they are opposed.

Thus it is possible to provide a cancellation circuit that will differentiate between signals derived at either side of the transformer, leading to a means of isolating bi-directional gain in a two-wire system.

This principle is used in FIGS. 4*a–d* to provide an effective bridge action in the device shown in detail in the remaining figures.

As shown in FIG. 1, amplifier 40 has a very low input impedance Z in, and this impedance performs the function of resistor $R_B$ in FIGS. 4*a–d*. The output impedance is approximately equal to that of lead 20, as is that of amplifier 52, thus ensuring symmetrical conditions across the combining resistor 44 which is much larger than resistor 18. The input impedance of amplifier 50 is also high to prevent signal attenuation across resistor 44. The output impedance of amplifier 52 performs the function of resistor $R_C$ in FIGS. 4*a–d*. The equivalent to the junction of resistors $R_B$ and $R_C$ in FIG. 1 is provided by the ground return leads of amplifiers 40 and 52.

Incoming signals appear at terminal 48 unattenuated, and in an attenuated form at input terminal 36 to amplifier 40. This amplifier performs the function of an amplifier A in FIG. 4 ensuring that the voltages present at terminals 42 and 48 across resistor 44 conform to the conditions described in FIG. 4*c*, and thus that a voltage will be present at the tap 46 of resistor 44. For signals derived from amplifier 52, the transformer 32 transfers power to load 20. In addition these signals appear in an attenuated form across the input impedance of amplifier 40. In this case the conditions described in FIG. 4*d* apply and the voltages at terminals 42 and 48 are opposed in sign. Providing that the voltage levels are compatible, determined by the precise setting of the tap or slider 46 on resistor 44, cancellation will take place and no signal will appear at the input to amplifier 50.

Similar processes take place at transformer 82, thus leading to a situation where unwanted signals are cancelled in both directions and bi-directional gain is possible. In addition there is no necessity for the impedance of load 20 or 91 to be of similar form, or for the gains of amplifier 50 or 52 to be identical.

Finally it will be noted from FIG. 1, that amplifier 52 serves as an inverter in a feedback path which can be traced through the main loop amplifier 50, resistor 62, amplifier 52 and resistor 44, the feedback being negative in sign. Instability in the system becomes unlikely unless the contribution of amplifier 70 becomes predominant and a feedback path is established via amplifier 50, the transformer, amplifier 70, resistor 62, amplifier 52 and resistor 44. These comments apply equally to the opposite direction of transmission.

The system described offers a general solution to the two-wire, bi-directional gain problem and the design approach to a situation where impedance of load 20 is a complex, variable impedance is now discussed.

In the practical case, impedance of load 20 will consist of an impedance presented by any one of the variety of types of generally known line. Conditions of exact 0° and 180° phase shifts present on the transformer no longer apply and additionally the line may have a falling audio response for non-loaded unequalized line, or fairly flat characteristics as is the case with loaded line.

In view of the stability of considerations mentioned above, the main result of the mismatch condition will be a poor return loss figure. For instance, a mismatch at transformer 82 will cause inadequate cancellation of the signal across resistor 62, causing a reflected component to appear at transformer 32 which has been operated upon by the overall loop gain of the device. However, the gain frequency response of the signal from amplifier 50 will essentially be unaffected by this mismatch as will be the response of the signal induced on the line.

Thus any approach to the problems caused by the variations in load impedance must take into consideration the requirements of return loss in practical subscriber loop situations.

Figure 2:
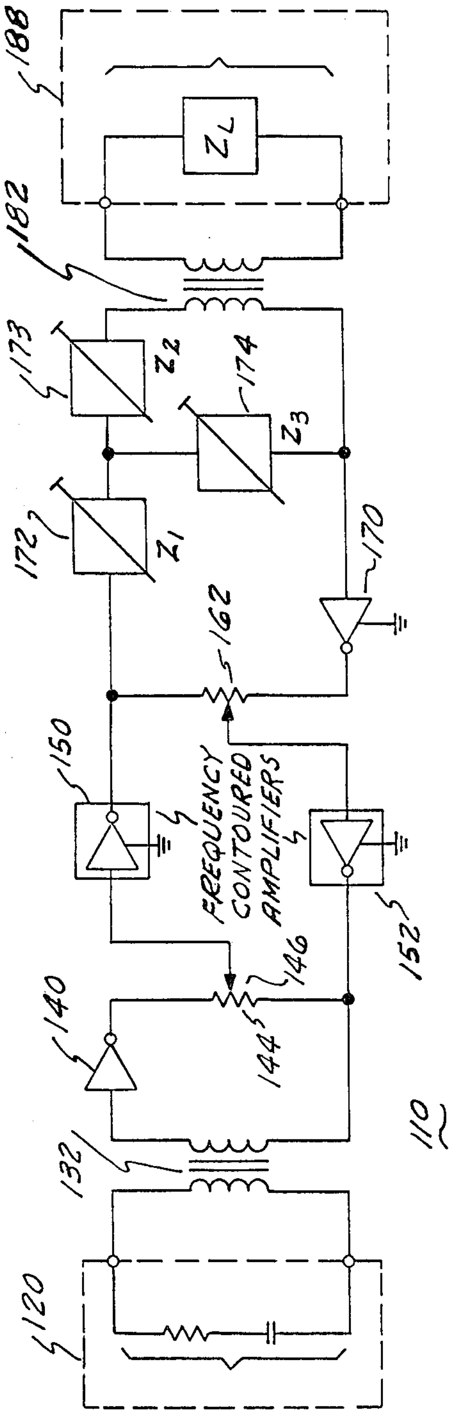
FIG. 2 is a schematic block diagram of a more complex general purpose repeater using the principle shown in FIG. 1.

FIG. 2 shows the block schematic of a repeater 110 for general line applications. This repeater contains the essential elements shown in FIG. 1 and each element therein is denoted by a like number preceded by the digit 1; i.e. amplifier 40 in FIG. 1 becomes amplifier 140 in FIG. 2, but in addition it provides impedance matching and, if necessary, frequency response contouring. The system is now described from a functional aspect, the circuit details follow subsequently.

The system as shown in FIG. 2 is employed in a terminal application where it is terminated on the left (west end) by a predominately resistive load 120 and on the right (east end) by an impedance 188 which represents a complex line. The requirements is to provide bi-directional gain, an essentially flat frequency response and a high return loss measured at the terminal port. This is achieved by introducing a T network of complex impedances across the transformer so that the variation of the line impedance 188 is precisely matched at every point in the frequency spectrum. This ensures that the signal from amplifier 170 has the correct relationship to that present at the output of amplifier 150 enabling cancellation to take place over the band. In addition the frequency responses of amplifier 150 and 152 are contoured as necessary, being essentially flat for lines of good band pass characteristic, and equalized for lines having a falling audio characteristic. As far as impedances $Z_1$, $Z_2$ and $Z_3$ are concerned these tend in practice to evolve into a simple T network consisting of mainly resistive components in the series arms, and inductive in the parallel arm. To cater for a variety of different lines and end sections, system switching can be introduced to enable the impedance pad to be rapidly modified for any particular set of conditions. Final balance is obtained in each case by the position of slider 160 on resistor 162.

Figure 3:
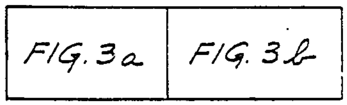
FIG. 3 is a block showing the cooperative positioning of FIGS. 3*a* and 3*b*.
Figure 3A:
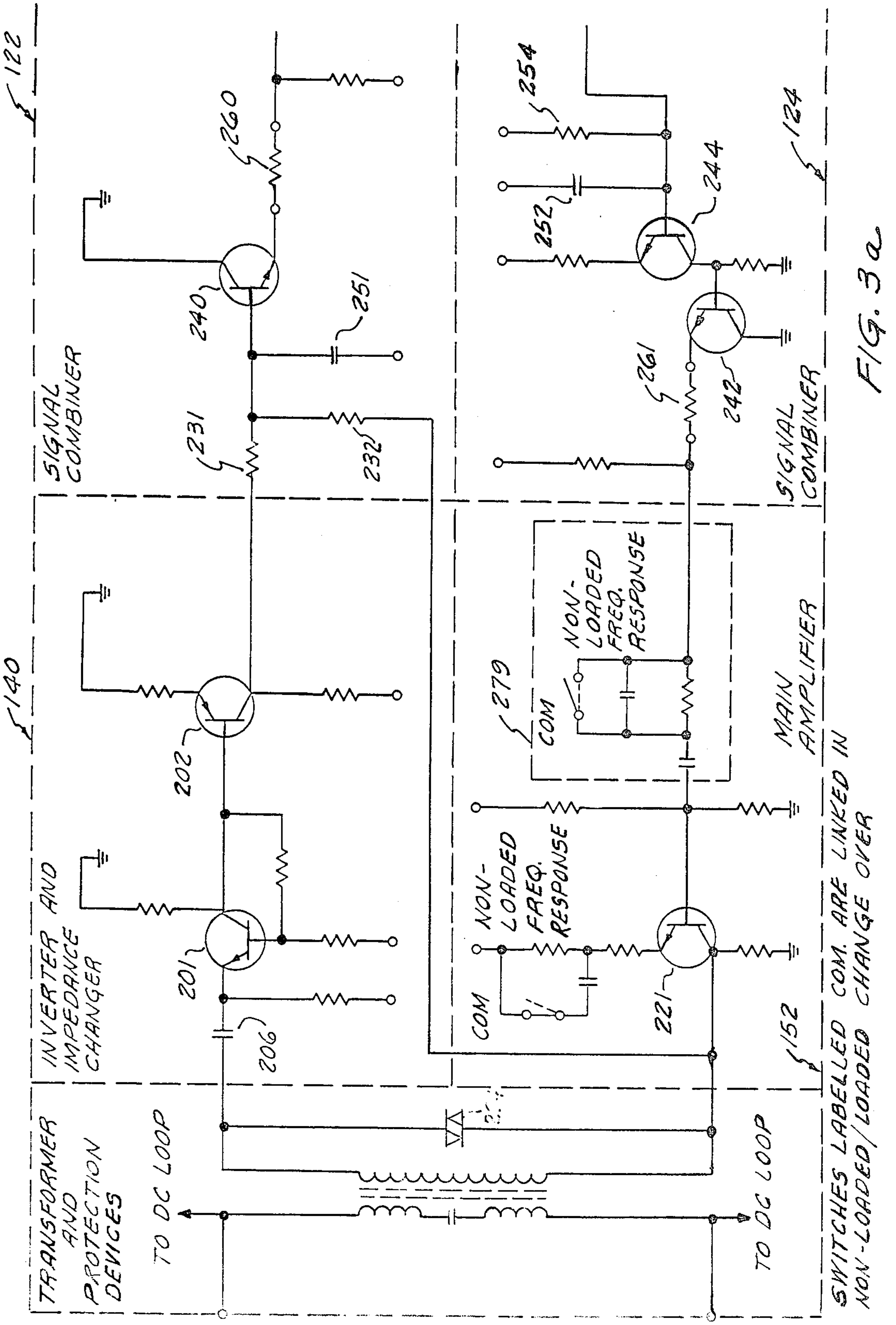
FIGS. 3*a* and 3*b* are detailed circuit drawings of a repeater employing the principle of my invention.
Figure 3B:
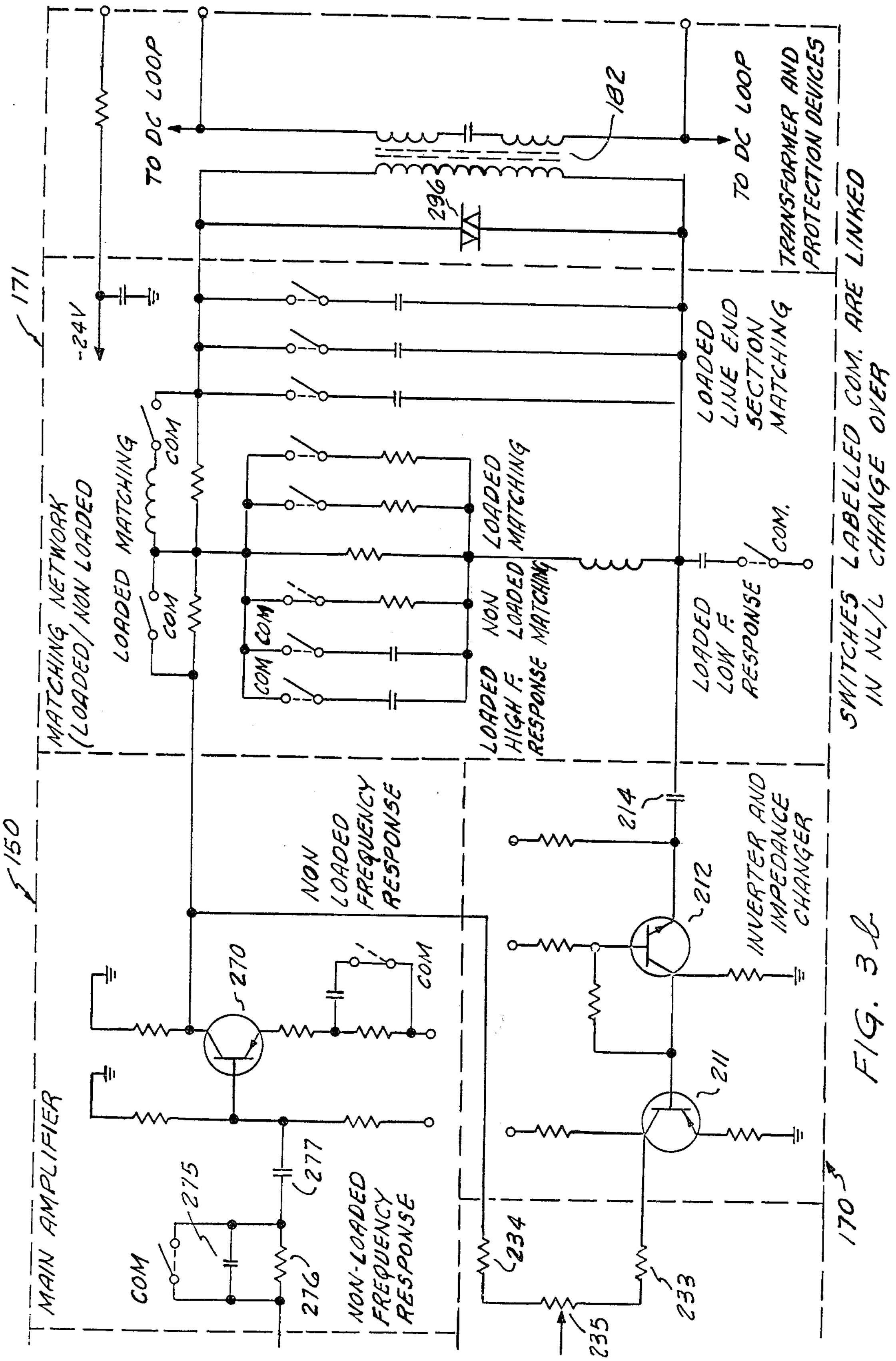

It should be mentioned at this stage that the general type of solution provided by the repeater is maintained despite the matching required, as networks may be synthesized to complement all line characteristics without invalidating the principle of signal cancellation. This approach may be extended to the intermediate case when matching is required at both ports of the device, or a two/four wire situation when the main amplifiers 150 and 152 would simply be connected in one direction to the two pair line transformers. A detailed schematic of the general purpose repeater is shown in FIG. 3, containing the circuits necessary to implement the various functions described above. The diagram may be divided into sections including the two inverter amplifiers 140 and 170, two signal combiners 122 and 124, the two main amplifiers 150 and 152 and the line matching network designated 171. Each of these will be described in detail before the overall factors of d.c. stability and repeatability are discussed.

Amplifier 140 is comprised of transistors 201 and 202, plus their associated resistors and capacitor 206, and the circuit configuration is identical with that of transistors 211 and 212, resistors and capacitor 214 in inverter amplifier 170. Transistor 201 is operated in grounded base configuration in order to minimize the input impedance, and is directly coupled to the PNP complementary transistor 202 which is operated as a grounded emitter stage. The required gain of the amplifier is determined by the loss across the transformer winding of transformer 132 and is in the order of 30 dB. The output impedance is approximately 1000 ohms, to ensure impedance symmetry in the combining circuit.

The function of signal combining circuit 122 is to compare the signals present at the outputs of respective transistors 202 of amplifier 140 and transistor 221 of main amplifier 152 and through a network including a pair of resistors 231 and 232. Alternatively the fixed resistances of 231 and 232 may be replaced, as shown in combining circuit 124 with two fixed resistance resistors 233 and 234 and a potentiometer 235, according to whether a fixed or variable balance is required. In addition to these resistors, an emitter follower transistor 240 (in combining circuit 122), or an inverter amplifier and an emitter follower transistor pair 242 and 244 (in combining circuit 124) may be used to impedance transform the combined signal.

The inverter is required in one amplifier for the reasons stated previously. Capacitors 251 (in combining circuit 122) and 252 (in combining circuit 124) are provided to limit the high frequency response of the repeater, while resistor 254 (in combining circuit 124) is used to prevent the base potential of transistor 244 reaching an unacceptable level. Transistor 244 provides a slight amount of gain to overcome the losses associated with resistor 254.

The emitter circuit resistors of transistor 240 and 242 may be selected to provide system gain control in discrete intervals.

Main amplifier 150 includes transistor 270 and its associated circuitry as the amplifying media and this amplifier is identical in configuration to main amplifier 152 comprised of transistor 221 and its allied circuits. Series equalization in main amplifier 150 is provided by the network comprising capacitor 275, resistor 276 and capacitor 277 and further equalization is effected by the partial decoupling of the emitter resistor. A like network 279 is provided for amplifier 152. Values have been delineated for these components shown in FIG. 3 to provide the frequency compensation necessary for non-loaded line.

Amplifier 170 (and 140) itself is a conventional grounded emitter stage which provides the necessary overall gain of the repeater. As care has been taken to minimize the signal losses in preceding sections of the device, the required amplifier gain is dependent mainly on the loss in matching network. If the matching network has a loss of about 3 dB at midband the required gain is 9 dB at 1 KHz, 13 dB at 3.5 KHz.

Varistors 294 and 296 are 20 volt devices which prevent damage to the input and output transistors. The capacitors in series with the primary windings of the transformers block the d.c. signalling currents and enable signalling and ringing to be carried around the transformers by way of V. F. choke decoupling.

In describing the direct current stability of the system, it should be noted that the feedback circuits from transistor 221 to transistor 240, and from transistor 270 to transistor 224 are d.c. coupled, thus the working points of these transistors are dependent upon the degree of stability incorporated. The critical area is in the impedance changers where appreciable a.c. gain is required. Both series and shunt feedback techniques are employed to stabilize transistors 201 and 212 and the resistance of both the output and bias resistors are kept low to avoid the effect of transistor parameter variations. The d.c. stability of the main amplifiers is considered adequate to hold the collector potential at about one half the supply voltage for changes in devices and temperature. As mentioned before the function of the resistor 254 at the base of transistor 244 is to maintain its potential against variations in level from the previous transistors.

An impedance compensating network 171 connected to the secondary of east end transformer 182 includes a combination of inductors, capacitors and resistors switched by a plurality of switches as shown in FIG. 3. This network enables an impedance and phase match to be maintained over a variety of non-loaded and loaded line characteristics, including all end sections likely to occur on loaded lines. The matching obtained is at best only an approximation as it is difficult to simulate the distributed nature of a transmission line using discrete components. However, in conjunction with the balance control resistor, a good phase and amplitude characteristic can be obtained with most line situations encountered in practice. FIG. 3 indicates that the switching process required to transform the unit from the non-loaded to the loaded line case is dependent on a number of simultaneously operated switches. Thus those labelled COM. in the figure would consist of a single multi-contact two way switch. Finally it is to be noted that the amount of signal appearing at the input to transistor 212 inpedance changer amplifier 170 is dependent on the nature of the network used, thus the working range of the balance resistor must be adequate to compensate for this variation.

While there has been shown what is at present thought to be the preferred embodiments of the invention, it will be understood that modification may be made therein and it is intended to cover in the appended claims all such modifications which fall within the true spirit and scope of the invention.

I claim:

1. A bi-directional signal transmission network comprising a first transformer receptive of input signals across its primary winding for transmission through said network, a first and a second single wire path, said paths being connected to the terminals of the transformer secondary whereby AC input signals received by said transformer primary winding will be inverted in one path relative to signals in the other path, means in said one path for re-inverting signals received from the transformer secondary by said one path, means for combining signals received from said transformer secondary in the other path with said re-inverted signals from said further inverting means and for cancelling any other signals, a unidirectional amplifier in said one path receptive of signals from said combining means for amplifying said received signals, a second transformer, the secondary winding of said second transformer receptive of signals from said amplifier for output transmission in one direction to its primary winding and also receptive of signals induced from its primary winding, one terminal of the secondary winding of said second transformer coupled to the output path from said amplifier and the other secondary winding terminal coupled to said other path wherein signals induced in the secondary winding of said second transformer are inverted in one path relative to the other path and signals conducted from said amplifier output path are not inverted across said secondary winding, re-inverting means in said other path for re-inverting signals in said other path relative to signals in said one path, means for combining signals from said one path with re-inverted signal from said other path for passing said combined signals and for inhibiting other signals from said other path, and a unidirectional amplifier in said other path receptive of signals passed by said last-mentioned combining means for passage of said signals to the secondary winding of the first-mentioned transformer.

2. A network as claimed in claim 1, wherein said amplifiers for each direction of transmission are matched.

3. A network as claimed in claim 1, wherein said combining means comprise a feedback path between the paths of said network.

4. A repeater as claimed in claim 3, wherein said feedback paths provide a DC coupling between the paths of said network to provide DC stability for said repeater.

5. A bi-directional two-wire hybrid repeater comprising a first and a second transformer with their primary windings across respective input ends of said hybrid repeater, each of said transformers having its load balanced relative to ground to invert AC signals induced between the respective terminals of each transformer secondary winding, a first and a second single wire path coupling the secondary windings of both transformers to one another in back-to-back relationship, each of said paths comprising a single wire leg for signal flow therethrough, a unidirectional amplifier in each of said paths with said amplifiers oppositely directed relative to one another in the respective paths and each having an output connected to a different one of said transformers, means in a first of said legs coupling an input of said first amplifier to one secondary terminal of said first transformer, means in a second of said legs coupling an input of said second amplifier to an opposite secondary terminal of said second transformer, each of said coupling means including means in its respective leg for inverting signals from the transformer coupled thereto and directed toward the respective amplifier coupled thereto, and a combining means coupled between the output of the respective inverting means and the other leg terminal of the transformer coupled to that inverting means to combine signals from said last mentioned transformer terminal and signals inverted in the respective inverting means for input to the respective amplifiers and to attenuate other signals.

* * * * *